United States Patent [19]

Hammerschlag

[11] 4,390,243

[45] Jun. 28, 1983

[54] APERTURE SCREEN FOR THE OBSERVATION OF BRIGHT OBJECTS WITH PRESERVATION OF THE RESOLUTION

[76] Inventor: Robert H. Hammerschlag, Albert Cuyplaan 35, 3723 GK Bilthoven, Netherlands

[21] Appl. No.: 198,121

[22] Filed: Oct. 17, 1980

[51] Int. Cl.³ .............................................. G02B 5/00
[52] U.S. Cl. ................................ 350/319; 350/276 R; 350/322; 350/448
[58] Field of Search ................. 350/17, 319, 448, 449, 350/431, 162 R, 162 SF, 163, 276 R, 322, 311

[56] References Cited

U.S. PATENT DOCUMENTS 1,919,482  7/1933  Rowell ................................ 350/322
3,620,599  11/1971  Ashkin ............................... 350/448
3,914,761  10/1975  Murase et al. .................... 350/162 R
4,239,327  12/1980  Grant .................................. 350/17

FOREIGN PATENT DOCUMENTS 928688  6/1963  United Kingdom ............ 350/276 R

OTHER PUBLICATIONS

Ringwood, Stephen D., *J. Br. Astron. Assoc.*, vol. 90, No. 5, Aug. 1980, pp. 429-433.

Primary Examiner—Jon W. Henry

[57] ABSTRACT

A screen for the reduction of light with preservation of the resolution comprising a plate with holes on distances equal or smaller than the light wavelength divided by the subtended angle of the object expressed in radians.

1 Claim, 5 Drawing Figures

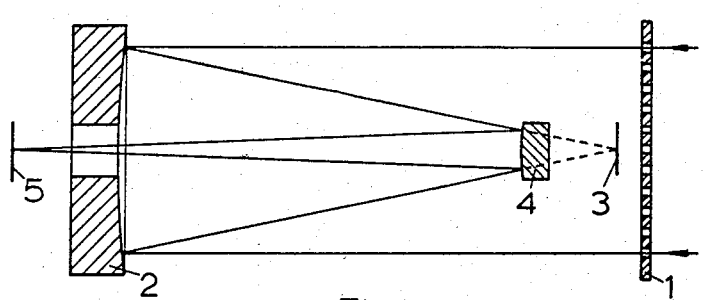
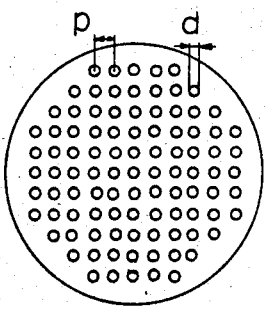
Fig. 1
Fig. 2
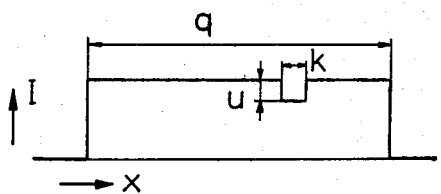
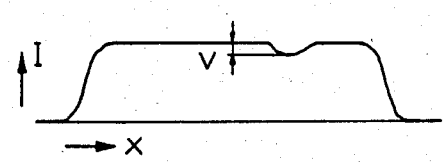
Fig. 3
Fig. 4
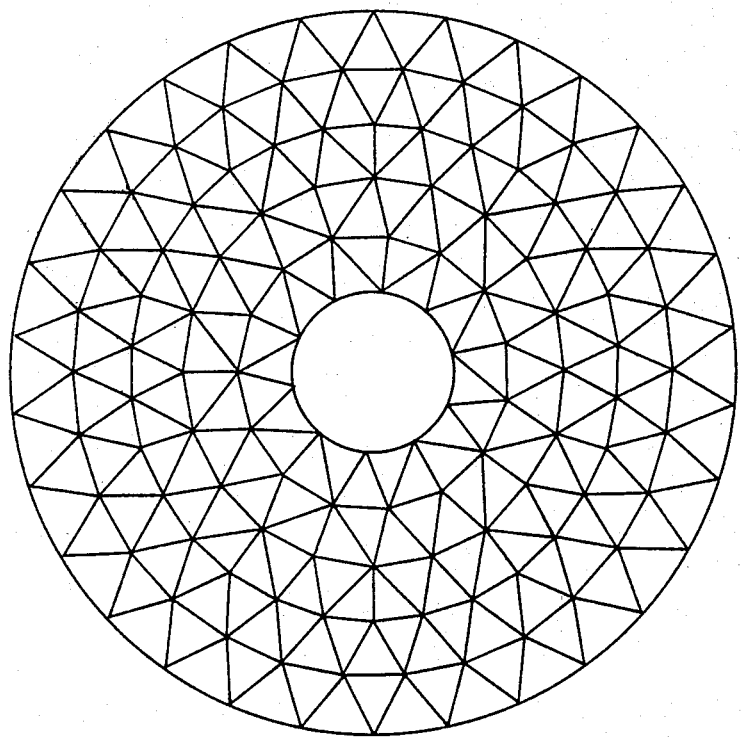
Fig. 5

APERTURE SCREEN FOR THE OBSERVATION OF BRIGHT OBJECTS WITH PRESERVATION OF THE RESOLUTION

BACKGROUND OF THE INVENTION

The sun is a bright object of which the observation with high resolution is of interest. Telescopes are used for this purpose. An inadmissible heating of the secondary optics occurs in telescopes with large numerical aperture (=small f number). A compact and stable construction is the reason to use a large numerical aperture.

A known method to reduce the incoming amount of light is a semi transparent glass plate. The semi transparency is achieved by an absorbing material added to the glass melt or by an absorbing and/or reflecting coating, which is evaporated on the glass surface. Both sides of the glass plate have to be worked with very high precision because otherwise the resolution is reduced by optical aberrations. This makes the semi transparent glass plate an expensive piece of the telescope. For large aperture diameters (>0.8 m) it is even doubtful whether the realisation is technically feasible.

A screen, which simply reduces the diameter of the aperture also reduces the resolution limit of the telescope, because the physical resolution limit is proportional to the wavelength of the light divided by the diameter of the aperture.

The obscuration of the centre part of the aperture gives an annular aperture. In books on optics it is claimed, that the resolution limit of an annular aperture is even slightly better than for a circular aperture of the same diameter. However, this is only true for the separation of two point sources. The image of structures on a light background has an inadmissible reduction of the contrast by the diffraction light.

The invention provides a screen, which reduces the incoming light with preservation of the resolution also of structures on a light background.

SUMMARY OF THE INVENTION

The screen for the reduction of light with preservation of the resolution comprises a plate with holes on distances equal or smaller than the light wavelength divided by the subtended angle of the object expressed in radians.

BRIEF DESCRIPTION OF THE DRAWINGS

FIG. 1 is a schematic drawing of a telescope with the aperture screen.

FIG. 2 is a front view of the aperture screen.

FIG. 3 gives the intensity distribution of a schematic bright object.

FIG. 4 gives the intensity distribution in the image of the object shown in FIG. 3.

FIG. 5 shows a regular supporting pattern of beams with equal distribution of the directions of the beampieces.

DESCRIPTION OF THE PREFERRED EMBODIMENTS

In FIG. 1 the plate with holes 1 is placed in front of a telescope, which consists of the primary mirror 2 and the secondary mirror 4. The primary mirror 2 forms a primary image in plane 3. The secondary mirror 4 transforms the primary image in plane 3 into the secondary image in plane 5. Without the plate with holes 1 the secondary mirror 4 would be heated too much.

We call the distance between the holes p, as indicated in FIG. 2. The subtended angle of the object, for instance the sun, is called q and expressed in radians. The wavelength of the light is called $\lambda$. For preservation of the resolution of structures on a light background it is required that $p \leq \lambda/q$. The subtended angle of the sun is 1/107 radians, consequently for observation of the sun the requirement is $p \leq 107 \lambda$. If the shortest wavelength of observation is 0.4 $\mu$m, this is the short wavelength side of the visible spectrum, it is found $p \leq 42$ $\mu$m. The sun shows interesting features in the infrared. For the observation of these features a larger distance p is allowed.

If we call the diameter of the holes d, as indicated in FIG. 2, the intensity reduction in the primary image is proportional to $(d/p)^4$. This reduction factor can be understood as the product of $(d/p)^2$ reduction of entered light by geometrical obscuration of the screen and $(d/p)^2$ reduction of intensity by the spread out of the light caused by diffraction.

If the holes are in a regular pattern, the diffracted light goes in discrete orders. The hole pattern works like a grating in spectrographs. But we use the zero order instead of the higher orders. The requirement $p \leq \lambda/q$ causes, that the higher order images of the object fall outside the field of the zero order image. Only very small deviations from the regular pattern are allowed in the case of use of the higher orders like in spectrographs. Substantially larger deviations are allowed if only the zero order is used, as is the case in the application of the invention. The reason is the constructive interference of the light in the zero order independent of the exact place of the individual holes in the plate. Even a random distribution of holes will work, if the mean distance p of the holes is sufficiently small compared to $\lambda/q$.

FIG. 3 shows the intensity distribution of a bright object and FIG. 4 its image. The place is indicated by x and the intensity by I. Suppose there is a small spot of subtended angle k on the object. The deviation u of the intensity of the small spot reduces to v in the image. The ratio $T = v/u$ is the transfer function of the spot.

I calculated from the diffraction theory, that $T = T_0/[1 + (qp/\lambda)^2]$ for the case of random distributed holes on mean distance p, in which $T_0$ is the transfer function of the spot with open aperture without plate with holes. $T_0$ is circa 0.8 for a spot of subtended angle $k = 2\lambda/b$, where b is the diameter of the telescope aperture. From this equation follow the numerical examples: $T \geq 0.8 T_0$ for $p \leq \lambda/2q$ or $T \geq 0.9 T_0$ for $p \leq \lambda/3q$. We can explain this result as follows: In the case of random distributed holes the diffracted light is not concentrated in discrete orders but smeared out over a large area. If the distance p between the holes is small enough, the diffracted light is smeared out over such a large area, that the remaining intensity does not disturb the zero order image of the object.

For the case of an ideal regular pattern with $p = \lambda/q$ I calculated $T > (1 - 1/N)T_0$, where N is the number of holes in one direction. The conclusion from the calculations is, that for p near $\lambda/q$ the regular pattern gives a better result than the random pattern, but for somewhat smaller p the quality of regularity is not critical and large deviations are allowed. Consequently, the screen for the application of the invention is easier to manufacture than a diffraction grating for spectroscopy. The form of the holes in the screen is not important. Any form will work, also line and ring shaped holes provided the distance p between the lines or rings is equal or smaller than $\lambda/q$. However, holes with about the same dimensions in both directions like circles or squares are preferred because of the higher mechanical rigidity of such a screen.

The screen can be manufactured by etching and/or electroplating. A photoresist film is used for printing the pattern of holes on the starting foil.

The screen becomes thin for short wavelengths of the light because of the small dimensions of the holes. A supporting frame work may be necessary for large telescopes. Such a frame work also allows the composition of the screen from pieces. If the width of the frame work beams is smaller than $\lambda/q$ there is of course little influence on the transfer function T. Broader beams reduce the transfer function T by a factor $1-w$, where w is the part of the aperture surface obscured by the frame work beams. The reason is diffracted light from the beams, which does not fall outside the zero order image. The diffracted light is collected in a bright dash perpendicular to the beam direction if many beams of the frame work have the same direction. This can lead to false interpretation of the image. It is better to distribute the beam directions as much as possible over the half circle of directions in the plane of the screen. The diffracted light is spread out over a larger disc shaped surface, which reduces the intensity and prevents false interpretation. FIG. 5 shows a regular supporting pattern with equal distribution of the directions of the beampieces. A random beam pattern has also an equal distribution of the directions of the beampieces. But a regular beam pattern like the one in FIG. 5 has more mechanical rigidity than a random beam pattern, which obscures the same part w of the aperture. The beam pattern of FIG. 5 is particularly rigid because it consists of triangles only.

What is claimed is:

1. An optical focusing assembly comprised of focusing optics and a plate made of an opaque material in series along an optical axis, said plate including a multiplicity of holes spaced apart about 42 $\mu$m or less, said holes extending substantially across the full aperture of said focusing optics and sized so that a substantial portion of a light beam incident along said optical axis on said plate will not pass through said plate to said focusing optics, whereby an image of reduced intensity but full resolution is achieved.

* * * * *